(12) United States Patent
McDowell

(10) Patent No.: US 7,508,339 B1
(45) Date of Patent: Mar. 24, 2009

(54) ANTI-JAM SYSTEM FOR USE WITH NORMAL L1 ONLY GPS RECEIVER

(75) Inventor: Charles E. McDowell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/388,798

(22) Filed: Mar. 24, 2006

(51) Int. Cl.
*G01S 5/14* (2006.01)

(52) U.S. Cl. ................ 342/357.02; 342/357.12; 342/357.15; 342/358

(58) Field of Classification Search ............ 342/357.02, 342/357.12, 357.15, 358
See application file for complete search history.

(56) References Cited

U.S. PATENT DOCUMENTS

| | | | |
|---|---|---|---|
| 5,952,968 A | 9/1999 | McDowell | |
| 5,990,831 A | 11/1999 | McDowell | |
| 6,421,000 B1 | 7/2002 | McDowell | |
| 6,933,885 B1 | 8/2005 | Stockmaster | |
| 6,961,017 B1 * | 11/2005 | Naylor et al. | 342/357.02 |
| 2005/0259760 A1 * | 11/2005 | Casabona et al. | 375/260 |

* cited by examiner

*Primary Examiner*—Thomas H Tarcza
*Assistant Examiner*—Fred H Mull

(57) ABSTRACT

An anti-jam system for use with a normal L1 Only Global Positioning System (GPS) receiver. The anti-jam system includes a switchable L1/L2 RF downconverter for receiving L1 and L2 RF signals from an RF signal source and converting a selected one of the L1 or L2 RF signals to a low frequency analog signal. An analog-to-digital converter (ADC) converts the low frequency analog signal to a digital signal. A digital anti-jam processor processes the digital signal to enhance anti-jam performance. A digital-to-analog converter (DAC) converts the processed digital signal to an enhanced analog signal. An RF upconverter converts the enhanced analog signal to an L1-based RF signal for use by a normal L1 Only GPS receiver.

19 Claims, 1 Drawing Sheet

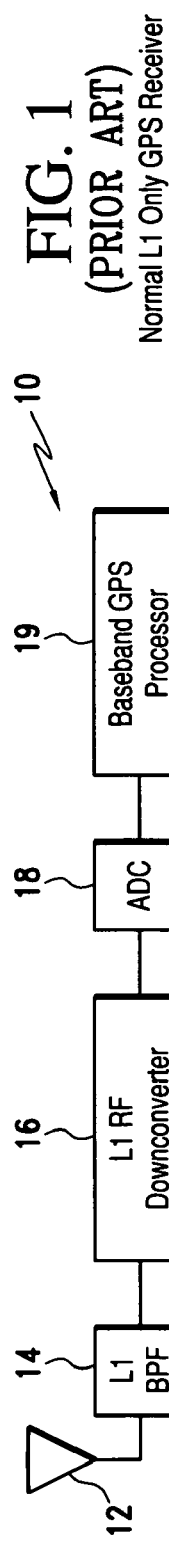

ANTI-JAM SYSTEM FOR USE WITH NORMAL L1 ONLY GPS RECEIVER

BACKGROUND OF THE INVENTION

1. Field of the Invention

The present invention relates generally to techniques for reducing the effects of jamming in radio-frequency receivers and more specifically to methods and apparatus for enhancing the reception of global positioning system (GPS) signals in the presence of jamming signals.

2. Description of the Related Art

Each satellite in the GPS transmits a pair of L-band signals. The pair of signals includes an L1 signal at a frequency of 1575.42 MHz and an L2 signal at a frequency of 1227.6 MHz. The L1 and L2 signals are bi-phase signals modulated by pseudo-random noise (PRN) codes and an information signal (i.e., navigation data) encoded at 50 Hz. The PRN codes facilitate multiple access through the use of a different PRN code by each satellite.

Upon detecting and synchronizing with a PRN code, a receiver decodes the PRN encoded signal to recover the navigation data, including ephemeris data. The GPS signals are subject to disruption by jamming signals, which may be transmitted either as narrow band signals or broadband signals. U.S. military forces utilize both L1 and L2 which are both subject to jamming interference.

U.S. Pat. No. 5,952,968, issued to present applicant C. E. McDowell, entitled, "Method and Apparatus For Reducing Jamming By Beam Forming Using Navigational Data," discloses a method of reducing jamming in a global positioning system (GPS) satellite receiving system that includes the steps of: a) selecting an initial weight value corresponding to each antenna element; b) selecting a weight adjustment scheme for adjusting the weights; c) measuring a power output from the antenna array; d) obtaining navigational data representing the orientation of the array; e) calculating for a gain of the antenna array corresponding each of the GPS satellites, using the navigational data to provide an indication of the orientation of the array relative to each GPS satellite; f) estimating a power level of a received signal corresponding to each GPS satellite; g) solving for the signal to noise ratio for each GPS satellite, using the estimated power level corresponding to each GPS satellite; h) iteratively and continuously adjusting the weights to obtain a greatest value of the signal to noise ratio; and i) continuously repeating steps (c) through (h).

U.S. Pat. No. 6,933,885, issued to Stockmaster, et al., entitled, "Miniaturized Digital GPS Anti-jam for Space and Size Constrained Applications," discloses a system for providing anti-jam protection that includes a two element antenna; a radio frequency downconverter providing an in phase and quadrature component of received signals by the two element antenna; and at least two analog to digital converters. The analog to digital converters are coupled to the radio frequency downconverter, wherein a first channel complex data and a second channel complex data formed from an output of each of the at least two analog to digital converters form a covariance matrix. A weight calculation is obtained from the covariance matrix providing optimal anti-jam suppression. The calculated weight for optimal anti-jam suppression is applied through hardware components.

U.S. Pat. No. 6,421,000, issued to present applicant C. E. McDowell, entitled "GPS Multipath Mitigation Using a Multi-Element Antenna Array," discloses a method and apparatus for mitigating multipath signal distortion using a multi-element antenna array. The multi-element antenna array is used to discriminate between the desired signal and its multipath components based on spatial angle of arrival. A reference signal, provided by the positioning system receiver, is used to compute element weightings that are utilized to null out the multipath components before they reach the receiver.

U.S. Pat. No. 5,990,831, issued to present applicant C. E. McDowell, entitled, "FFT Implementation of Digital Antenna Array Processing In GNSS Receivers," discloses global navigation satellite system (GNSS) receivers, including digital spatial nulling arrays, and a method of providing antenna pattern outputs using the same. The digital spatial nulling array receives multiple antenna element inputs. A fast Fourier transform (FFT) is applied to the multiple antenna element inputs to obtain frequency domain representations of the multiple antenna element inputs. The antenna pattern outputs are provided by the spatial nulling array as a function of the frequency domain representations of the multiple antenna element inputs.

Referring now to FIG. 1 (Prior Art) the architecture of a normal L1 Only Global Positioning System (GPS) receiver is illustrated, designated generally as 10. The term "normal L1 Only Global Positioning System (GPS) receiver" refers to a GPS receiver that can only receive an L1 band satellite GPS signal. The receiver 10 may include an antenna 12, an L1 band pass filter (BPF) 14, an L1 RF downconverter 16, an analog-to-digital converter (ADC) 18 and a baseband GPS processor 19.

Referring to FIG. 2 (Prior Art), the architecture of a normal simultaneous L1/L2 GPS receiver is illustrated, designated generally as 20. An L1/L2 diplexer 22 is used to receive GPS signals from antenna and then feed L1 and L2 band signals to an L1 RF downconverter 23 and L2 RF downconverter 24 in a parallel manner. After being converted by respective ADC's 26, 27, signals from both the L1 band and L2 band will be processed by a baseband GPS processor 28. This receiver can receive GPS signals from both L1 and L2 bands, but it is more expensive than the normal L1 only GPS receiver 10.

Referring to FIG. 3 (Prior Art), an integrated anti-jamming GPS receiver 30 is illustrated. This includes L1/L2 Diplexer 31, a switchable L1/L2 RF downconverter 32, an ADC 33, digital anti-jamming (AJ) processor 34 and baseband GPS processor 36. Anti-jamming is made possible by the digital anti-jamming processing before GPS signals are processed by the baseband GPS processor.

A federated L1/L2 AJ system would use a switchable L1/L2 RF downconverter that downconverts an L1 or L2 RF signal to IF or near-baseband as required for A/D conversion and AJ processing. Then it would upconvert the signals after AJ processing to L1 or L2 band RF signals according to the source before AJ processing. However, this would result in relatively big and expensive AJ GPS systems.

SUMMARY OF THE INVENTION

In a broad aspect, the present invention is an anti-jam system for use with a normal L1 Only Global Positioning System (GPS) receiver. The anti-jam system includes a switchable L1/L2 RF downconverter for receiving L1 and L2 RF signals from an RF signal source and converting a selected one of the L1 or L2 RF signals to a low frequency analog signal. An analog-to-digital converter (ADC) converts the low frequency analog signal to a digital signal. A digital anti-jam processor processes the digital signal to enhance anti-jam performance. A digital-to-analog converter (DAC) converts the processed digital signal to an enhanced analog signal. An RF upconverter converts the enhanced analog signal to an L1-based RF signal for use by a normal L1 Only GPS receiver.

The anti-jamming system of the present invention will downconvert either the L1 or L2 band signals and always upconvert to the L1 band signal after digital anti-jamming processing. Thus, the relatively inexpensive and smaller L1 only GPS receivers, which are subject to jamming interference, can be equipped with anti-jamming capacity.

BRIEF DESCRIPTION OF THE DRAWINGS

FIG. 1 (Prior Art) is a block diagram of a normal L1 Only GPS receiver.

FIG. 2 (Prior Art) is a block diagram of a normal simultaneous L1/L2 GPS receiver.

FIG. 3 (Prior Art) is a block diagram of an integrated anti-jam GPS receiver.

FIG. 4 illustrates a GPS receiver having enhanced anti-jam performance in accordance with the principles of the present invention.

DETAILED DESCRIPTION OF THE INVENTION

Referring now to FIG. 4, a preferred embodiment of a GPS receiver having enhanced anti-jam performance in accordance with the principles of the present invention is illustrated, designated generally as 40. The GPS receiver 40 includes an anti-jam system, designated generally as 42, for use with a normal L1 Only GPS receiver 44. The anti-jam system typically includes an L1/L2 diplexer (or other suitable diplex filter) 46 for receiving L1 and L2 radio frequency (RF) signals from an antenna 48. A switchable L1/L2 RF downconverter 49 receives the L1 and L2 RF signals from the L1/L2 diplexer 46 and converts a selected one of the L1 or L2 RF signals to a low frequency analog signal.

An analog-to-digital converter (ADC) 50 converts the low frequency analog signal to a digital signal. A digital anti-jam processor 52 processes the digital signal to enhance anti-jam performance. Possible digital AJ processors may include, for example, multi-element spatial nullers, frequency excision processors, spatio-temporal systems (e.g. STAP) or space-frequency systems (e.g. SFAP), such as known in this field. Most commonly the processing is frequency excision (to remove narrowband jamming with an adaptive digital filter), or multi-element spatial nulling.

A digital-to-analog converter (DAC) 54 converts the processed digital signal to an enhanced analog signal. An RF upconverter 56 converts the enhanced analog signal to an L1-based RF signal for use by the normal L1 Only GPS receiver 44. The normal L1 Only GPS receiver includes an L1 band pass filter (BPF), an L1 RF downconverter, an analog-to-digital converter (ADC), and a baseband GPS processor.

Other embodiments and configurations may be devised without departing from the spirit of the invention and the scope of the appended claims.

The invention claimed is:

1. An anti-jam system for use with a normal L1 Only Global Positioning System (GPS) receiver, comprising:
 a) a switchable L1/L2 RF downconverter for receiving L1 and L2 RF signals from an RF signal source and converting a selected one of said L1 or L2 RF signals to a low frequency analog signal;
 b) an analog-to-digital converter (ADC) for converting said low frequency analog signal to a digital signal;
 c) a digital anti-jam processor for processing said digital signal to enhance anti-jam performance;
 d) a digital-to-analog converter (DAC) for converting said processed digital signal to an enhanced analog signal; and,
 e) an RF upconverter for always converting said enhanced analog signal to an L1-based RF signal regardless as to whether said selected RF signal was an L1 or L2 RF signal, said L1-based RF signal for use by a normal L1 Only GPS receiver.

2. The anti-jam system of claim 1, further including said RF signal source, comprising a diplex filter for receiving said L1 and L2 radio frequency (RF) signals.

3. The anti-jam system of claim 1, further including said RF signal source, comprising an L1/L2 diplexer for receiving said L1 and L2 radio frequency (RF) signals.

4. The anti-jam system of claim 1, wherein said digital anti-jam processor comprises a frequency excision processor.

5. The anti-jam system of claim 1, wherein said digital anti-jam processor comprises a multi-element spatial nuller.

6. The anti-jam system of claim 1, wherein said digital anti-jam processor comprises a spatio-temporal system.

7. The anti-jam system of claim 1, wherein said digital anti-jam processor comprises a space-frequency system.

8. A Global Positioning System (GPS) receiver having enhanced anti-jam performance, comprising:
 a) an anti-jam system, comprising:
  i. a switchable L1/L2 RF downconverter for receiving L1 and L2 RF signals from an RF signal source and converting a selected one of said L1 or L2 RF signals to a low frequency analog signal;
  ii. an analog-to-digital converter (ADC) for converting said low frequency analog signal to a digital signal;
  iii. a digital anti-jam processor for processing said digital signal to enhance anti-jam performance;
  iv. a digital-to-analog converter (DAC) for converting said processed digital signal to an enhanced analog signal; and,
  v. an RF upconverter for always converting said enhanced analog signal to an L1-based RF signal regardless as to whether said selected RF signal was an L1 or L2 RF signal, said L1-based RF signal; and,
 b) a normal L1 Only Global Positioning System (GPS) receiver for receiving said L1-based RF signal.

9. The Global Positioning System (GPS) receiver of claim 8, further including said RF signal source, comprising a diplex filter for receiving said L1 and L2 radio frequency (RF) signals.

10. The Global Positioning System (GPS) receiver of claim 8, further including said RF signal source, comprising an L1/L2 diplexer for receiving said L1 and L2 radio frequency (RF) signals.

11. The Global Positioning System (GPS) receiver of claim 8, wherein said digital anti-jam processor comprises a frequency excision processor.

12. The Global Positioning System (GPS) receiver of claim 8, wherein said digital anti-jam processor comprises a multi-element spatial nuller.

13. The Global Positioning System (GPS) receiver of claim 8, wherein said digital anti-jam processor comprises a spatio-temporal system.

14. The Global Positioning System (GPS) receiver of claim 8, wherein said digital anti-jam processor comprises a space-frequency system.

15. A method for reducing the effects of jamming signals in a receiving system utilizing a normal L1 Only Global Positioning System (GPS) receiver, comprising the steps of:

a) receiving L1 and L2 RF signals from an RF signal source and converting a selected one of said L1 or L2 RF signals to a low frequency analog signal;
b) converting said low frequency analog signal to a digital signal;
c) processing said digital signal to enhance anti-jam performance;
d) converting said processed digital signal to an enhanced analog signal; and,
e) always converting said enhanced analog signal to an L1-based RF signal regardless as to whether said selected RF signal was an L1 or L2 RF signal, said L1-based RF signal for use by a normal L1 Only GPS receiver.

16. The method of claim 15, wherein said step of processing said digital signal to enhance anti-jam performance comprises utilizing a frequency excision processor.

17. The method of claim 15, wherein said step of processing said digital signal to enhance anti-jam performance comprises utilizing a multi-element spatial nuller.

18. The method of claim 15, wherein said step of processing said digital signal to enhance anti-jam performance comprises utilizing a spatio-temporal system.

19. The method of claim 15, wherein said step of processing said digital signal to enhance anti-jam performance comprises utilizing a space-frequency system.

* * * * *